United States Patent [19]

Schick et al.

[11] 3,977,997

[45] Aug. 31, 1976

[54] MANUFACTURE OF A MODIFIED TITANIUM COMPONENT FOR ZIEGLER-NATTA CATALYSTS

[75] Inventors: Hans Schick, Mannheim; Heinz Mueller-Tamm; Peter Hennenberger, both of Ludwigshafen, all of Germany

[73] Assignee: BASF Aktiengesellschaft, Ludwigshafen (Rhine), Germany

[22] Filed: Dec. 16, 1974

[21] Appl. No.: 533,144

[30] Foreign Application Priority Data

Jan. 3, 1974 Germany............................ 2400190

[52] U.S. Cl............................................. 252/429 B
[51] Int. Cl.$^2$............................................ B01J 31/02
[58] Field of Search ................................ 252/429 B

[56] References Cited
UNITED STATES PATENTS

| | | |
|---|---|---|
| 3,032,510 | 5/1962 | Tornquist et al................ 252/429 C |
| 3,216,987 | 11/1965 | Price ............................... 252/429 B |
| 3,389,129 | 6/1968 | Yamada et al................... 252/429 B |

*Primary Examiner*—J. Poer
*Attorney, Agent, or Firm*—Johnston, Keil, Thompson & Shurtleff

[57] ABSTRACT

A process for the manufacture of a modified titanium-containing component of a Ziegler-Natta catalyst for the polymerization of $C_{3-6}$ α-monoolefins, wherein a specific titanium-containing compound and a specific phosphorus-containing compound are dry-milled at a specific grinding acceleration in a vibratory ball mill. The characteristic feature of the process of the invention is that a mill is used which has a specific useful volume and the mill is initially charged with a specific amount of the titanium-containing compound, which is milled at a low temperature while the phosphorus-containing compound is gradually added, whereupon milling is continued while the temperature of the process material is gradually raised to a specific value and maintained at said value for a specific period of time, whereupon, if desired, milling is again continued at a lower temperature for a specific period of time. In this manner, modified titanium-containing components are obtained which in the polymerization process produce highly reproducible yields of polymer.

2 Claims, No Drawings

MANUFACTURE OF A MODIFIED TITANIUM COMPONENT FOR ZIEGLER-NATTA CATALYSTS

The present invention relates to a process for the manufacture of a modified titanium-containing component of a Ziegler-Natta catalyst for the polymerization of $C_{3-6}$ α-monoolefins, wherein a. a titanium-containing compound of the general formula $$TiCl_3 \cdot nAlCl_3,$$

where
   $n$ denotes a number ranging from 0 to 0.7, and b. a phosphorus-containing compound of the general formula $$O_mPX_3,$$

where
   $m$ denotes 0 or 1,
   X denotes R, OR or $NR_2$ and
   R denotes alkyl, aryl, alkaryl or aralkyl, all containing not more than 24 carbon atoms, are dry-milled in a vibratory ball mill at a grinding acceleration of from 30 to 80 m × sec$^{-2}$ and at a molar ratio of (a) : (b) of from 1:0.01 to 1:1.

Processes of this kind are known in a variety of forms. They are mainly designed to produce modified titanium components which, after being activated with organoaluminum compounds or the like, provide catalysts which, in the polymerization of α-olefins, give high specific yields of poly-α-olefins and/or provide poly-α-olefins having a relatively high content of stereo-regular polymer. See for example German Published Application No. 1,595,303 and Austrian Pat. Nos. 279,157; 285,932 and 285,933.

The prior art processes have produced noteworthy results. However, one certain drawback thereof is that the reproducibility of the results in the polymerization of α-olefins is unsatisfactory, particularly as regards the specific yields of poly-α-olefins. In equal batches, the specific yields show relatively large fluctuation, and this is detrimental for operation on an industrial scale.

It is an object of the present invention to provide a process of the kind defined above, by means of which modified titanium components may be obtained which, when used in Ziegler-Natta catalysts in the polymerization of α-olefins, produce highly reproducible results, particularly as regards the specific yields of poly-α-olefins.

We have found that the above object may be achieved by using mills having a relatively large useful volume and by bringing the starting materials for the modified titanium components together under specific conditions and also milling them under specific conditions.

The present invention relates to a process for the manufacture of a modified titanium-containing component of a catalyst for the polymerization of $C_{3-6}$ α-monoolefins by the Ziegler-Natta method, wherein a. a titanium-containing compound of the general formula $$TiCl_3 \cdot nAlCl_3,$$

where
   $n$ denotes a number of from 0 to 0.7, and b. a phosphorus-containing compound of the general formula $$O_mPX_3,$$

where
   $m$ denotes 0 or 1,
   X denotes R, OR or $NR_2$ and
   R denotes alkyl, aryl, alkaryl or aralkyl, all of not more than 24 carbon atoms, are dry-milled in a vibratory ball mill at a grinding acceleration of from 30 to 80 m · sec$^{-2}$ and at a molar ratio of (a) : (b) of from 1:0.01 to 1:1. The process of the invention is characterized in that 1. use is made of a mill having a useful volume of from 2 to 200 and in particular of from 10 to 50 liters,
2. the mill is initially charged with from 0.1 to 120 and in particular from 6 to 30 kg of the titanium-containing compound (a), whereupon
3. the process material is milled at from −50° to −5° and in particular from −30° to −15°C while the phosphorus-containing compound (b) is added continuously or in small portions in a total amount corresponding to the desired molar ratio and over a period of time ranging from 2 to 100 and in particular from 5 to 15 hours, whereupon
4. the process material is milled while the temperature thereof is raised to from 5° to 60° and in particular from 10° to 30°C over a period of from 0.1 to 5 and in particular from 1 to 2 hours and is then held at said temperature for from 1 to 100 and in particular from 5 to 15 hours, and
5. if desired, the process material is milled for a further period of from 1 to 30 minutes at a temperature of from −50° to −5° and in particular from −30° to −15°C.

The following comments relate to the materials used in our novel process.

The titanium-containing compounds (a) of the above general formula are those conventionally used, particularly $TiCl_3$ and $TiCl_3 \cdot ⅓ AlCl_3$. These are commercially available and require no further explanation.

Suitable phosphorus-containing compounds (b) of the above general formula are also conventional compounds satisfying the said formula, particularly those in the formulae of which X denotes R or $NR_2$ and
   R denotes $C_{1-8}$ alkyl and in particular $C_{1-4}$ alkyl or a phenol radical.

Suitable compounds of this kind are described for example in U.S. Pat. No. 3,186,977.

Particular examples of very suitable phosphorus-containing compounds are triphenylphosphine, triphenylphosphine oxide, tri-n-butylphosphine, tri-n-butylphosphine oxide and hexamethylphosphoric triamide. Particularly suitable compounds are triphenylphosphine oxide, tri-n-butylphosphine and hexamethylphosphoric triamide.

The modified titanium components for Ziegler-Natta catalysts, as prepared in the process of the invention, may be used in conventional manner in the polymerization of α-olefins, i.e. these titanium components will generally be used in conjunction with an organometallic activator, particularly aluminum alkyl compounds of the formulae Al(alkyl)$_3$ and ClAl(alkyl)$_2$, containing from 1 to 8 carbon atoms, especially triethylaluminum and triethylaluminum chloride.

Particularly good results are achieved in the dry polymerization of α-olefins, i.e. polymerization in the absence of liquid auxiliaries, although polymerization in the presence of liquid auxiliaries may also be successfully carried out. The molecular weight may be controlled by using conventional chain-stoppers, particularly hydrogen. Suitable α-olefins for polymerization are for example those having from 3 to 8 carbon atoms, particularly propylene, butene-1 and 4-methyl-pentene-1.

EXAMPLE 1

Manufacture of Modified Titanium Component

The starting materials used are a. a titanium compound of the formula TiCl$_3$ . ⅓ AlCl$_3$ and
b. tri-n-butylphosphine in a molar ratio of (a) : (b) of from 1:1/6.

Milling is carried out in a vibratory ball mill in which the grinding acceleration is 50 m · sec$^{-2}$ and the useful volume is 50 liters.

The mill is initially charged with 30 kg of the titanium-containing compound (a) and the process material milled at a temperature of −20°C while the amount of phosphorus-containing compound (b) corresponding to the above molar ratio is added continuously or in small portions over a period of 10 hours (during which period the phosphorus-containing compound is homogeneously distributed in the mixture), whereupon the process material is further milled while the temperature thereof is raised to 20°C over 2 hours and is held at this temperature over a period of 5 hours.

There is obtained a modified titanium compound which may be used in the polymerization process described below.

Polymerization Using Said Modified Titanium Compound

Use is made of a stirred reactor having a capacity of 0.8 m$^3$ in which a propylene pressure of 25 atmospheres gauge is maintained and the flow of hydrogen is 150 l/hr (STP), the controlled reaction temperature being 70°C and polymerization being carried out in the absence of solvents or diluents in a bed of 300 kg of particulate propylene polymer. The reaction is carried out continuously by feeding to the reactor 12 g/hr of the modified titanium component and, separately, 36 g/hr of (C$_2$H$_5$)$_2$AlCl. The product discharged from the reactor is a particulate polypropylene (average particle size 0.2 mm). The product contains 75 ppm by weight of titanium and 5% by weight of material soluble in boiling n-heptane and has an intrinsic viscosity of 2.5 dl/g.

When the process is carried out according to the above Example over a period of 1000 hours, the hourly yield of polypropylene obtained fluctuates by only 5% above or below the average value.

EXAMPLE 2

Manufacture of Modified Titanium Component

The starting materials used are a. a titanium compound of the formula TiCl$_3$ . ⅓ AlCl$_3$ and
b. tri-n-butylphosphine in a molar ratio of (a) : (b) of from 1:1/6.

Milling is carried out in a vibratory ball mill in which the milling acceleration is 50 m × sec$^{-2}$ and the useful volume is 50 liters.

The mill is initially charged with 30 kg of the titanium-containing compound (a) and the process material is milled at a temperature of −20°C while the amount of phosphorus-containing compound (b) corresponding to the above molar ratio is added continuously or in small portions over a period of 10 hours (during which period the phosphorus-containing compound is homogeneously distributed in the mixture), whereupon the process material is further milled while the temperature thereof is raised to 20°C over 2 hours and is held at this temperature over a period of 5 hours. The process material is then milled for 10 minutes at a temperature of −20°C.

There is obtained a modified titanium component suitable for use in the polymerization described below.

Polymerization Using Said Modified Titanium Component

Use is made of a stirred reactor having a capacity of 0.8 m$^3$ in which a propylene pressure of 25 atmospheres gauge is maintained and the flow of hydrogen is 100 l/hr (STP), the controlled reaction temperature being 70°C and polymerization being carried out in the absence of solvents or diluents in a bed of 300 kg of particulate propylene polymer. The reaction is carried out continuously by feeding to the reactor 12 g/hr of the modified titanium component and, separately, 36 g/hr of (C$_2$H$_5$)$_2$AlCl. The product discharged from the reactor is a particulate polypropylene (average particle size 0.2 mm). The product contains 75 ppm by weight of titanium and 5% by weight of material soluble in boiling n-heptane and has an intrinsic viscosity of 2.8 dl/g.

When the process is carried out according to the above Example over a period of 1000 hours, the hourly yield of polypropylene obtained fluctuates by only 5% above or below the average value.

We claim:
1. A process for the manufacture of a modified titanium-containing component of a Ziegler-Natta catalyst for the polymerization of C$_{3-6}$ α-monoolefins by dry-milling a. a titanium-containing compound of the general formula $$TiCl_3 . nAlCl_3 ,$$

wherein
n denotes a number of from 0 to 0.7, and
b. a phosphorus-containing compound of the general formula $$O_mPX_3,$$

where
m denotes 0 or 1,
X denotes R, OR or NR$_2$ and
R denotes alkyl, aryl, alkaryl or aralkyl, all of not more than 24 carbon atoms, in a vibratory ball mill at a grinding acceleration of from 30 to 80 m × sec$^{-2}$ and in a molar ratio of (a) : (b) of from 1:0.1 to 1:1, which comprises:

1. initially charging a mill which has a useful volume of from 2 to 200 liters, with from 0.1 to 120 kg of the titanium-containing compound (a),
2. milling the process material at a temperature of from −50° to −5°C while the amount of phosphorus-containing compound (b) corresponding to the desired molar ratio is added continuously or in small portions over a period of from 2 to 100 hours,
3. further milling the process material while the temperature thereof is raised to from 5° to 50°C over a period of from 0.1 to 5 hours and then held at this temperature over a period of from 1 to 100 hours.

2. A process as set forth in claim 1 wherein the process material obtained from step (3) is further milled at a temperature of from −50° to −5°C over a period of from 1 to 30 minutes.

* * * * *